United States Patent [19]

Rispeter

[11] Patent Number: 5,626,363

[45] Date of Patent: May 6, 1997

[54] ADJUSTABLE STEERING DEVICE

[75] Inventor: Siegfried Rispeter, Besigheim, Germany

[73] Assignee: Dr. Ing. h.c.F. Porsche AG, Weissach, Germany

[21] Appl. No.: 616,600

[22] Filed: Mar. 15, 1996

Related U.S. Application Data

[62] Division of Ser. No. 404,317, Mar. 15, 1995, Pat. No. 5,562,306.

[30] Foreign Application Priority Data

Mar. 14, 1994 [DE] Germany ................. 44 09 250.4
Apr. 20, 1994 [DE] Germany ................. 44 13 798.2

[51] Int. Cl.[6] .............................................. B62D 1/19
[52] U.S. Cl. .................... 280/775; 280/777; 74/493
[58] Field of Search .......................... 280/775, 777; 74/493

[56] References Cited

U.S. PATENT DOCUMENTS

| | | | |
|---|---|---|---|
| 2,836,988 | 6/1958 | Cashman | 74/493 |
| 4,317,387 | 3/1982 | Myers et al. | 74/493 |
| 4,602,520 | 7/1986 | Nishikawa et al. | 280/775 |
| 4,900,059 | 2/1990 | Kinoshita et al. | 280/775 |
| 4,941,679 | 7/1990 | Baumann et al. | 280/775 |
| 5,078,022 | 1/1992 | Ichikawa | 74/493 |
| 5,143,420 | 9/1992 | Higashino et al. | 280/775 |
| 5,193,848 | 3/1993 | Faulstroh | 280/775 |

FOREIGN PATENT DOCUMENTS

| | | | |
|---|---|---|---|
| 0231453A1 | 8/1987 | European Pat. Off. | |
| 0477509A3 | 4/1992 | European Pat. Off. | |
| 3318935C1 | 12/1984 | Germany | |
| 3808270A1 | 9/1989 | Germany | |
| 3914608C1 | 10/1990 | Germany | |
| 4205929A1 | 9/1992 | Germany | |
| 134370 | 6/1988 | Japan | 280/775 |

*Primary Examiner*—Paul N. Dickson
*Attorney, Agent, or Firm*—Evenson McKeown Edwards & Lenahan PLLC

[57] ABSTRACT

An adjustable steering device for motor vehicles has a steering spindle which can be axially displaced in at least one jacket tube by way of an adjusting device. The adjusting device adjusting device is provided with an operable adjusting element which holds the steering spindle and releases it for the displacement. The adjusting element includes at least one pressure segment which is held by at least one elastic tensioning element in a receiving ring embracing the protective steering tube. It has a toothing which can be brought into a fixing and a displacement position by a corresponding toothing on a protective steering tube by way of at least one tensioning device. As a result, an adjustable steering device is provided which ensures a simple and secure axial displacement and fixing while the behavior in a crash is good.

11 Claims, 10 Drawing Sheets

ADJUSTABLE STEERING DEVICE

This is a divisional application of application Ser. No. 08/404,317, filed Mar. 15, 1995, now U.S. Pat. No. 5,562,306.

BACKGROUND AND SUMMARY OF THE INVENTION

This invention relates to an adjustable steering device for motor vehicles comprising a steering spindle which is axially adjustably displaceably mounted in a jacket tube.

An axially adjustable steering device for motor vehicles is known from German Patent Document DE-33 18 935 C1. In the case of this device, a motor-driven pinion is constantly engaged with a protecting steering tube by way of a toothing. This protective steering tube is fixedly connected with the steering spindle and can be displaced by way of the pinion.

Furthermore, from U.S. Pat. No. 2,836,988, an axially adjustable steering column is known in the case of which a spindle nut is caused to rotate by way of a motor-driven pinion. This spindle nut acts upon a protective steering tube which is connected with the steering spindle and is therefore axially displaced.

It is an object of the invention to provide an improved adjustable steering device which ensures a simple and secure axial adjustment and fixing while exhibiting good crash accommodating characteristics.

According to the invention, this object is achieved by providing an arrangement wherein the adjusting element includes at least one pressure segment which is held by means of an elastic tensioning element on a protecting steering tube which has a toothing, said pressure element having a toothing which is movable between a fixing and a displacement accommodating position by means of a tensioning device which controls the interengagement of the toothing on the protective steering tube and on the pressure element.

By means of the invention, it is mainly achieved that, in addition to an axial adjustment of the steering wheel carried by a steering spindle, an optimal energy absorption is achieved also in the case of a crash by way of an integrated deformation element.

The axial adjustment takes place essentially by way of a pressure segment of an adjusting element which, by means of a toothing, is engaged with a protective steering tube for fixing purposes and can be disengaged for the axial displacement.

In an advantageous further development of the invention, an energy absorption in the case of a crash is achieved by means of a deformation element in the form of a corrugated tube or of a reversed tube which is arranged between the pressure piece and a lower end of a jacket tube surrounding the protective steering tube.

In an advantageous further development, the pressure segment is held in a receiving ring and has a toothing which is correspondingly opposite a toothing of the protective steering tube. The operating of the adjusting element or of the pressure piece for taking up a fixed position and a displaced position takes place by way of a tensioning device consisting of a tensioning element. This is connected with an adjusting rod of a handle and can be adjusted by a rotating or a displacing so that the steering spindle can be brought into the displacement position or into the fixing position.

In certain preferred embodiments, tensioning element of the device acts directly in a flat manner on the pressure segment which can be rotated and/or displaced by way of the adjusting rod of the handle, and an adjustment or a fixing of the steering spindle can therefore be carried out in a simple manner. An axial displacement of the steering spindle and thus an adjustment of the steering wheel into different positions with respect to the driver takes place in the loose position in which the toothings slide on one another corresponding to a ratchet effect. The pressure segment is held by way of the elastic tensioning element in the receiving ring in such a manner that, when the steering spindle or the protective steering tube is axially displaced, the pressure segment is pressed out of the toothing of the protective steering tube. The tooth-on-tooth position is avoided as a result of the elastic tensioning element.

In various further developments, the tensioning element may consist of an eccentric, a curved piece or a conical part. For connecting the adjusting rod with the handle, a hexagon fitting or the like is provided on the tensioning element.

The adjustment of the tensioning element may take place manually or by means of a motor, a corresponding switch being provided on the dashboard for the adjustment by means of a motor, by means of which switch the axial adjustment may be switched on and off.

For limiting the axial displacement, a longitudinal slot is provided in the protective steering tube into which a stop sleeve projects, and a starting position and end position can therefore be fixed. The jacket tube may have an impression whose shoulder strikes against the bearing of the pressure piece during the adjustment.

For absorbing energy in the case of a crash, a deformation element is connected with the adjustment element, which deformation element is supported on the receiving ring for the pressure segment. The opposite, facing-away end of the deformation element is held on a bearing ring which is fixed to the jacket tube by way of a snap ring. The deformation element can therefore be mounted in a simple manner in that the bearing ring is removed. During the mounting, the prestressed crash element is used as a spring element—tolerance compensation—and holds the mounted parts under prestress (noiselessness).

The actual receiving space for the adjusting device in the jacket tube in certain preferred embodiments has a larger diameter than the adjoining jacket tube, whereby advantageously a supporting wall is created for the receiving ring and therefore also for the deformation element. Furthermore, this receiving space is dimensioned such that optionally an adjusting device, which has a receiving ring and a pressure segment, may be accommodated as well. This adjusting device comprises a spindle nut which can be driven by a pinion and which moves by way of a toothing on the jacket tube, in which case the pinion can be driven by a motor or manually.

In certain preferred embodiments, bearings of the jacket tube on the vehicle body are selected such that the lower bearing is provided approximately in the center of the deformation element and between two bearings adjacent to the lower bearing of the adjusting element.

According to certain preferred embodiments with a simplified and lower-cost device, the outer jacket tube surrounding the protective steering tube is provided with a recess in which the pressure piece is held in a radially displaceable manner between outwardly projecting walls. The tensioning device is also disposed in these walls so that a constructionally simple solution is obtained for the axial adjustment of the steering column. A deformation element is not provided in the case of this device.

Other objects, advantages and novel features of the present invention will become apparent from the following detailed description of the invention when considered in conjunction with the accompanying drawings.

DETAILED DESCRIPTION OF THE DRAWINGS

Throughout the following description of the preferred embodiments, and in the drawings, like reference characters are used to indicate similar functioning parts. Unless otherwise described, the description of parts for one drawing figure applies to parts having the same reference characters in the other drawing figures.

Figure 1:
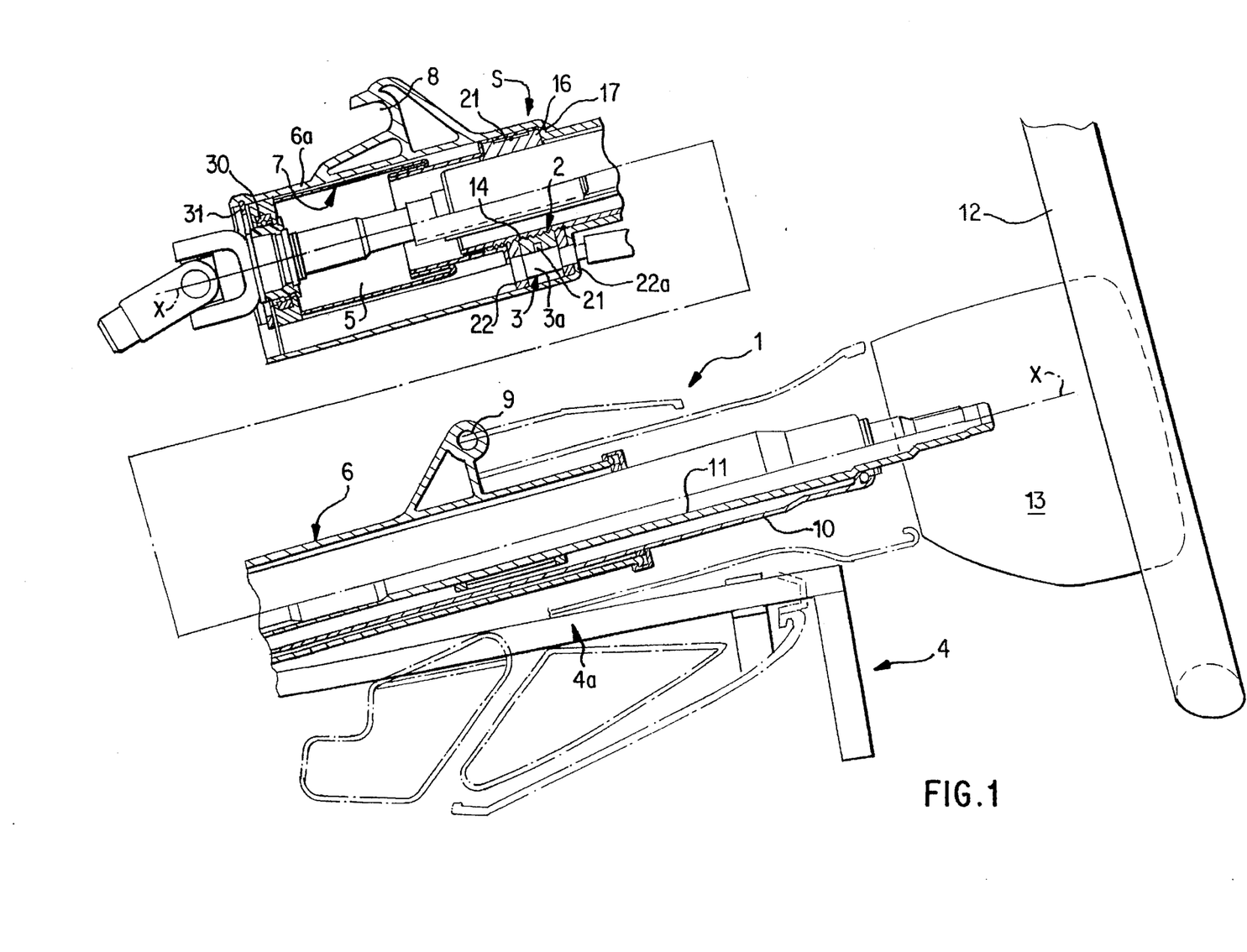
FIG. 1 is a partial sectional view of a steering column with an axial adjusting device, constructed according to a preferred embodiment of the invention.
Figure 2:
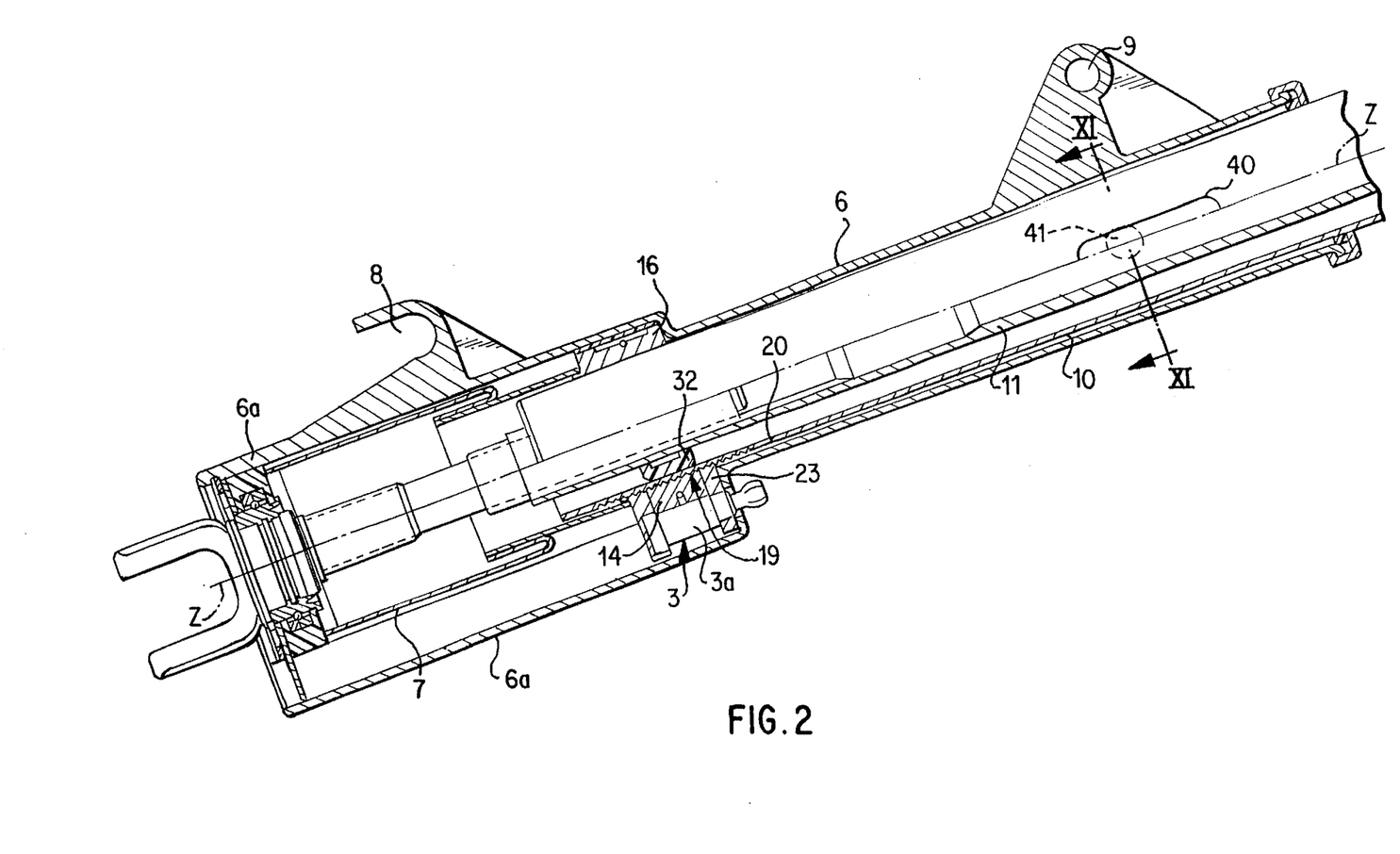
FIG. 2 is an enlarged representation of the adjusting device according to FIG. 1.

Referring to FIGS. 1 and 2, an adjustable and energy-absorbing steering device is arranged in a steering column 1 and comprises essentially an adjusting element 2, a pressure exercising tensioning element 3 and an adjusting rod 4a of a handle 4 which is connected with this tensioning device 3. This adjusting device S is arranged in a receiving space 5 of a jacket tube 6, 6a together with a deformation element 7. The whole jacket tube 6 is fastened by way of at least two bearings 8, 9 on the vehicle body and receives an interior protective steering tube 10 as well as a steering spindle 11 held in it which carries a steering wheel 12 on the end side. In addition to the deformation element 7, an air bag may be arranged in the steering wheel head 13 for collision protection of a driver. In the longitudinal direction, the steering spindle 11 is connected by way of bearings rotatably in a fixed manner with the protective steering tube 10.

The adjusting element 2 comprises a pressure segment 14 which is held in a recess 15 of a receiving ring 16. This ring 16 is arranged on the protective steering tube 10 and is supported on a radial annular wall 17 of the jacket tube portion 6a whose diameter is expanded. This area of the jacket tube 6 is constructed with a partial expansion 18 for receiving the tensioning device 3.

The pressure segment 14 has a toothing 19 which is directed to a toothing 20 of the protective steering tube 10. The toothings 19, 20 are preferably aligned transversely to the longitudinal axis Z—Z of the steering column 1. The pressure segment 14 is held on the receiving ring 16 by way of a resilient tensioning element 21, such as a rubber elastic O-ring.

The tensioning device 3 is in an operative connection with the pressure segment 14. This tensioning device 3 is rotatably or slidably held in bearing lugs 22, 22a of the receiving ring 16.

Figure 10:
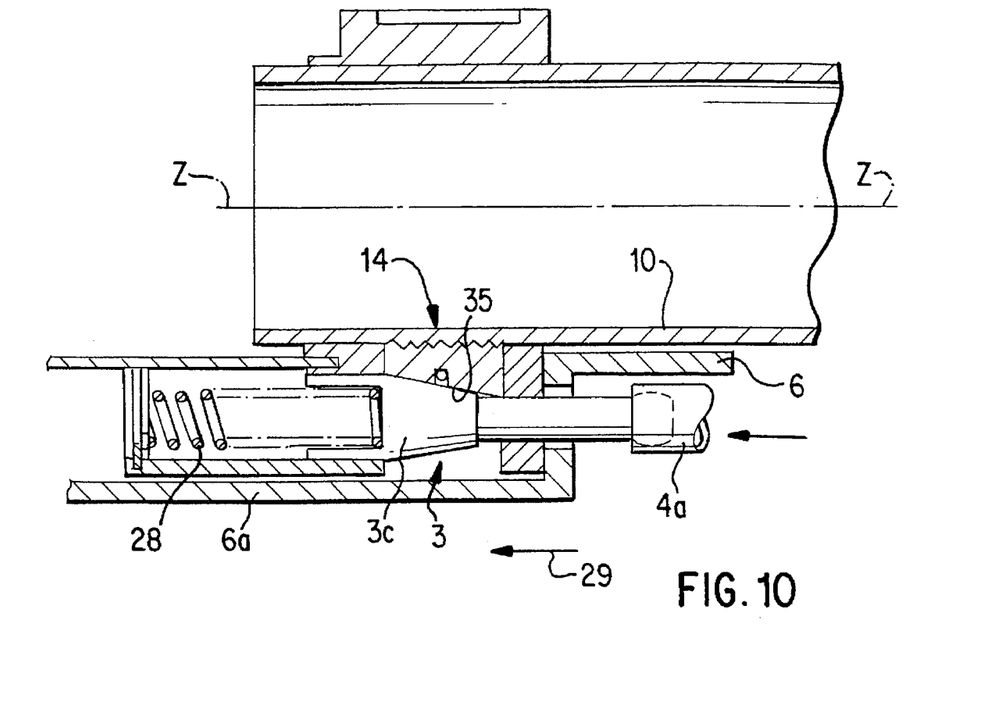
FIG. 10 is a view of another embodiment showing the pressure segment as a conical piece.
Figure 11:
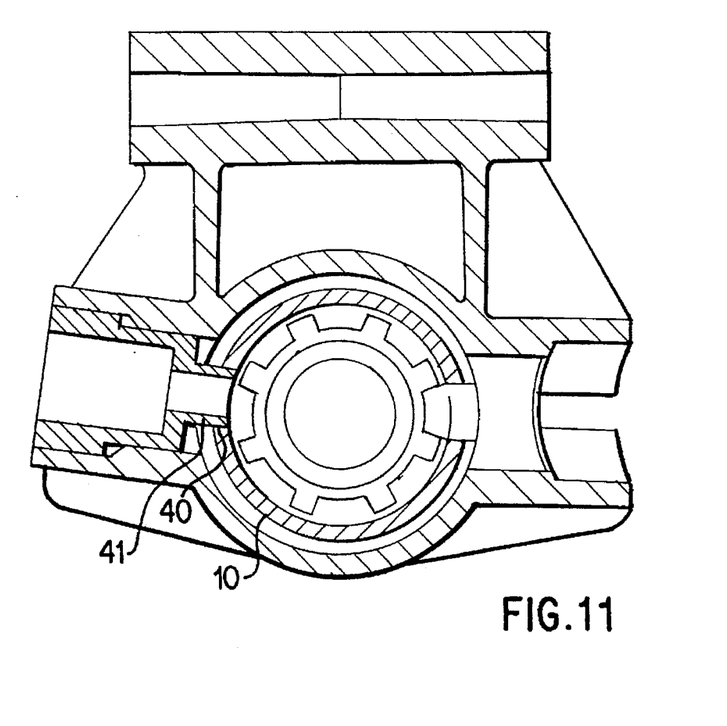
FIG. 11 is a sectional view of the steering column in the area of a bearing slot and of a stop sleeve, constructed according to preferred embodiments of the invention.

The tensioning device 3 may consist of an eccentric part 3a (FIG. 1 and 2), a curved segment 3b (FIG. 8) or a conical part 3c (FIG. 10). The tensioning device 3 may also have an oval cross-section.

Figure 8:
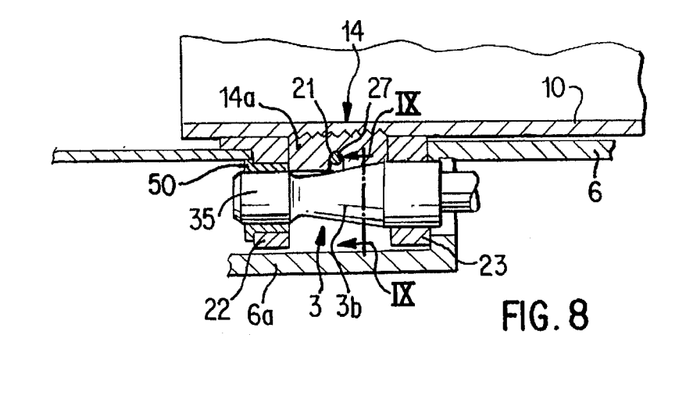
FIG. 8 is a partial, sectional schematic view of a construction with the pressure segment as a curved segment with tolerance compensation.

By means of the construction of the tensioning device 3 as a curved segment 3b as shown in FIG. 8, a tolerance compensation is achieved of all play in the axial and radial direction by way of a threaded bush 50 and the dynamic stiffness is increased at the same time. As a result of the slope of the curved cone during a revolution corresponding to the thread pitch of 1 mm a portion of the tolerance can be absorbed and the remainder can be absorbed by way of the shape of the curve according to FIG. 9. When the adjusting device 3 is constructed as a conical piece 3c as shown in FIG. 10, an automatic tolerance compensation takes place by the contact pressure caused by a spring 28. In the case of this conical piece, the tolerance compensation is continuous.

The axial adjusting of the steering column or of the steering spindle 11 with the steering wheel 12 takes place by the rotating of the handle 4 which can be connected by way of a hexagon nut-socket type connection or the like with an adjusting lever 4a.

In the displacement accommodating position, the toothings 19, 20 of the pressure segment 14 and of the protective steering tube 10 are only loosely engaged with one another by way of the tensioning element 21 so that the protective steering tube 10 can be axially displaced with respect to the pressure segment 14. In this case, the toothings 19, 20 slide on one another and a so-called ratchet effect is achieved.

In the fixing position, the tensioning element 3 is rotated and the toothings 19, 20 of the pressure segment 14 and of the protective steering tube 10 are engaged with one another.

For this purpose, the tensioning device 3 is constructed in the manner of an eccentric part 3a, a curved segment 3b or as a conical part 3c so that in the case of a rotation at a small angle either a tension on the pressure segment 14 for achieving the fixing position or, during a continuous rotating or rotating back, the tension on the pressure segment 14 is reduced and the displacement position is taken up.

Figure 9:
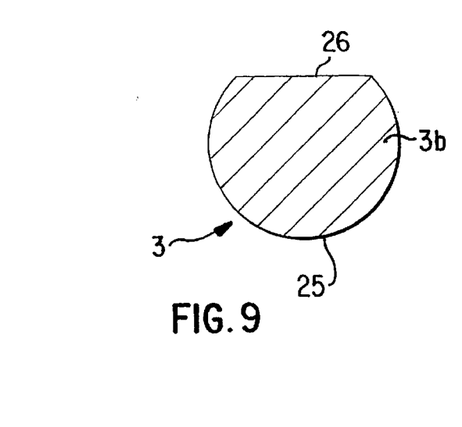
FIG. 9 is an enlarged sectional view according to Line IX—IX of FIG. 8.

As illustrated in FIGS. 8 and 9 in detail by means of the curved segment 3b, a circular arc path 25 changes into a flattened plane surface 26 which is opposite the pressure segment 14 in the displacement accommodating position, in which case the circular arc path 25 of the pressure segment 14 is acted upon with a tension when in the fixing position. In the case of this embodiment according to FIG. 8, the pressure segment has a diagonal surface 27 which will then be opposite the surface sections 25 and 26.

According to the embodiment of FIG. 10, the tensioning device 3 consists of a conical piece 3c which, under the tension of the spring 28, is pressed into the fixing position. For achieving a displacement accommodation position, the conical piece 3c is pressed against the spring 28 in the direction of the arrow 29 so that the pressure segment 14 is released from the toothing 20 on the steering tube 10. This pressure sentient 14 also has a diagonal surface 35. The pressure segment 14 may also have such a construction that, for the displacement accommodating position, it is pulled against the tension of the spring 28 instead of being pressed.

The operating or the swivelling of the tensioning device 3 takes place either manually by way of the adjusting rod 4a of the handle 4 or by a motor, in which case the tensioning device 3 will then be connected with a controllable motor. The operating of the motor takes place by way of a switch arranged on the dashboard by means of which the adjusting movement can be initiated.

The pressure segment 14 and the tensioning device 3 are arranged in a perpendicular center plane X—X of the steering column 1. The plane X—X extends adjacent to the lower bearing 8 of the jacket tube 6 and between the two bearings 8 and 9. Bearing 8 is provided approximately in the center of the deformation element 7 and in the center between the adjusting device and a lower bearing ring 30. This bearing ring 30 is fixed in the jacket tube 6, 16a by way of a snap ring 31 or the like. At the same time, the bearing ring 30 forms a receiving device for the steering spindle 11 in the jacket tube 6. Additional radial bearing elements 32 for the steering spindle 11 are provided between the receiving ring 16 and the jacket tube 6.

Figure 3:
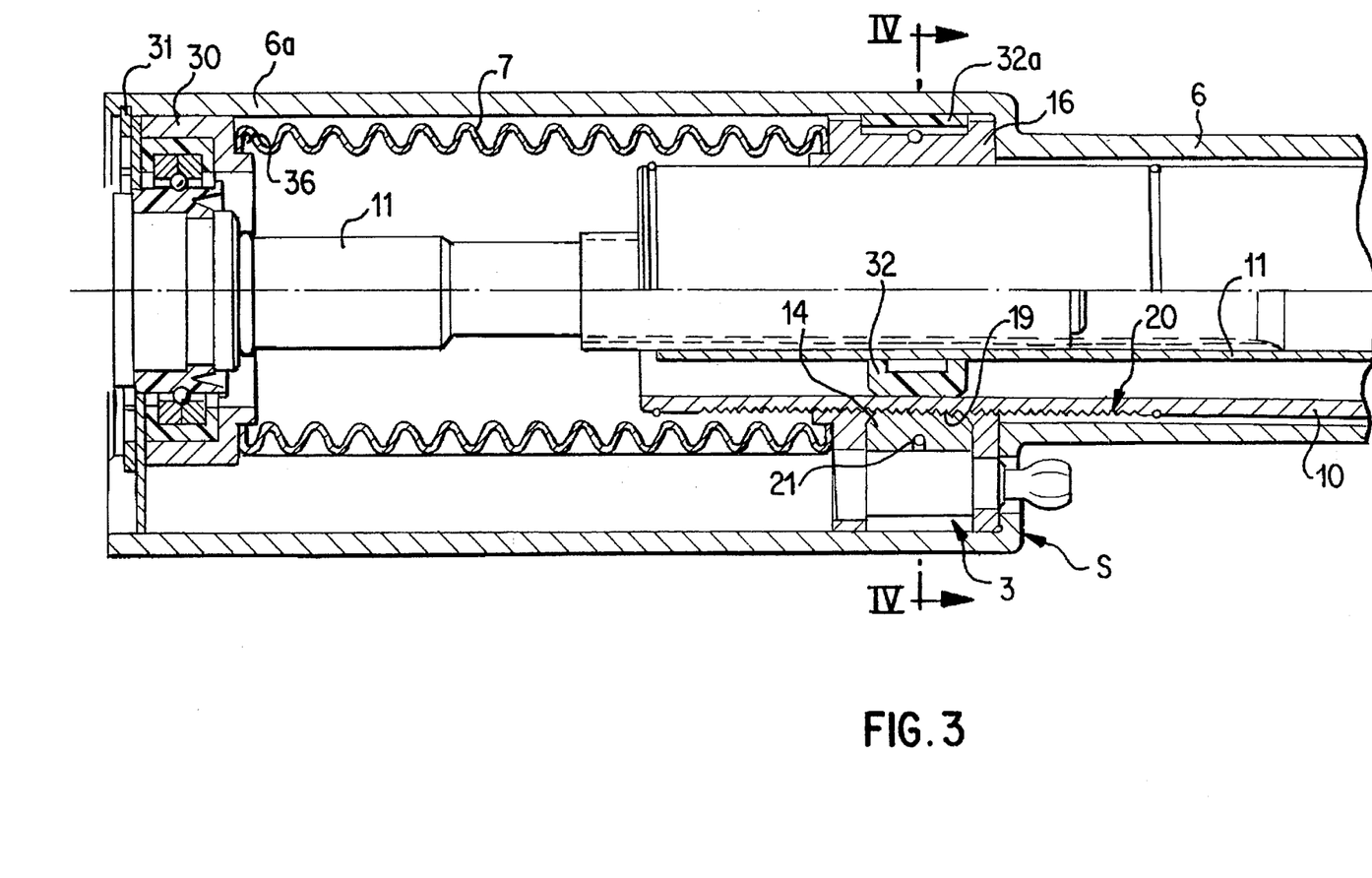
FIG. 3 is an enlarged sectional view of a jacket tube of a steering column comprising a deformation element constructed as a corrugated tube and an adjusting device, with an eccentric part as the pressure segment, constructed according to another preferred embodiment of the invention.
Figure 4:
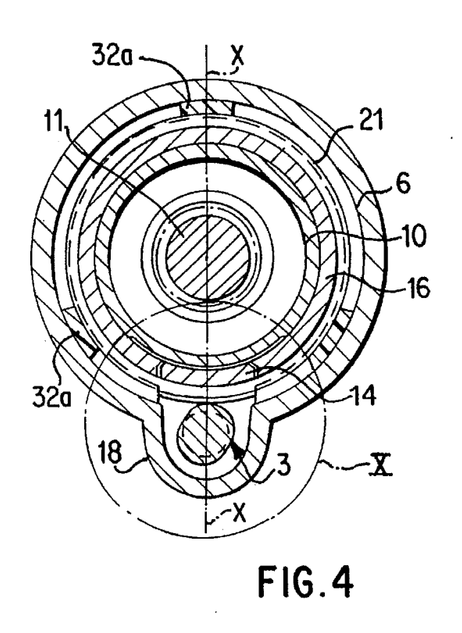
FIG. 4 is a sectional view taken along Line IV—IV of FIG. 3.
Figure 5:
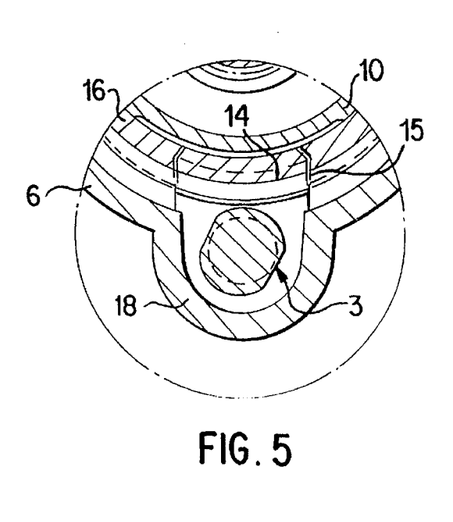
FIG. 5 is an enlarged detail X according to FIG. 4, showing parts in a fixing position of the steering wheel.
Figure 6:
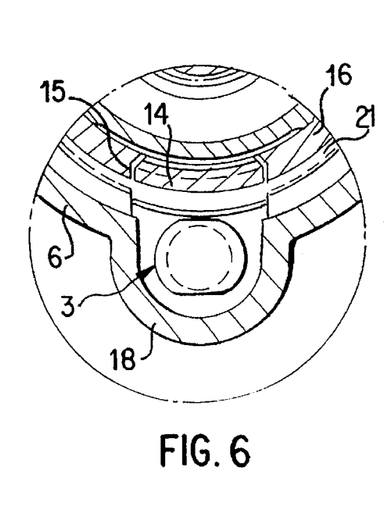
FIG. 6 is an enlarged detail X similar to FIG. 5 but showing parts in a steering wheel displacement accommodating position.
Figure 7:
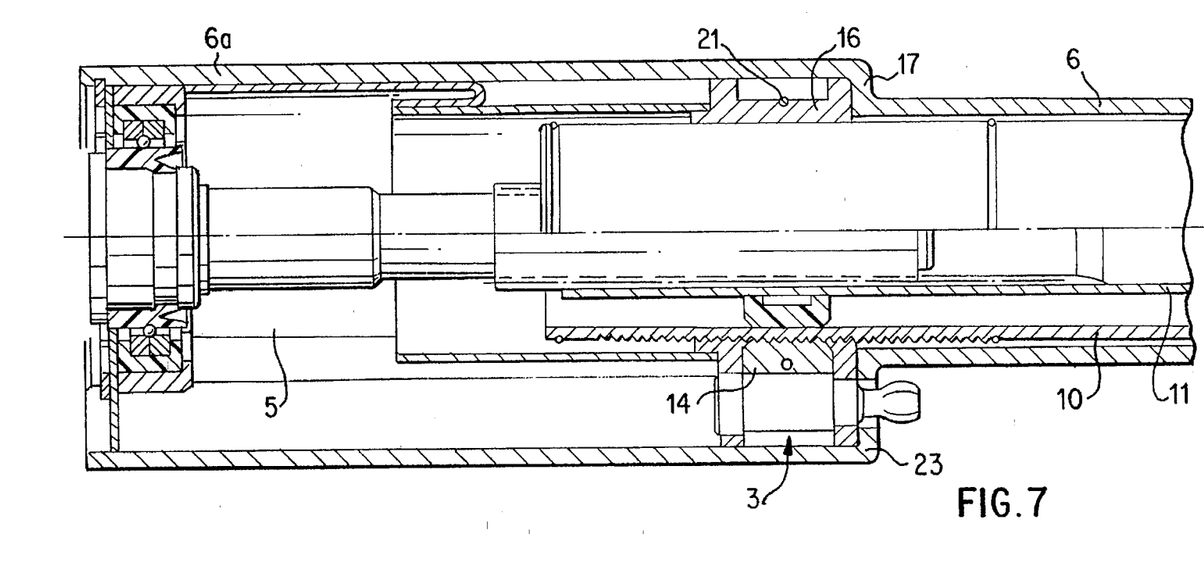
FIG. 7 is a sectional view of a jacket tube of a steering column with a deformation element constructed as a reversed tube, and with an adjusting device constructed according to another preferred embodiment of the invention.
Figure 12:
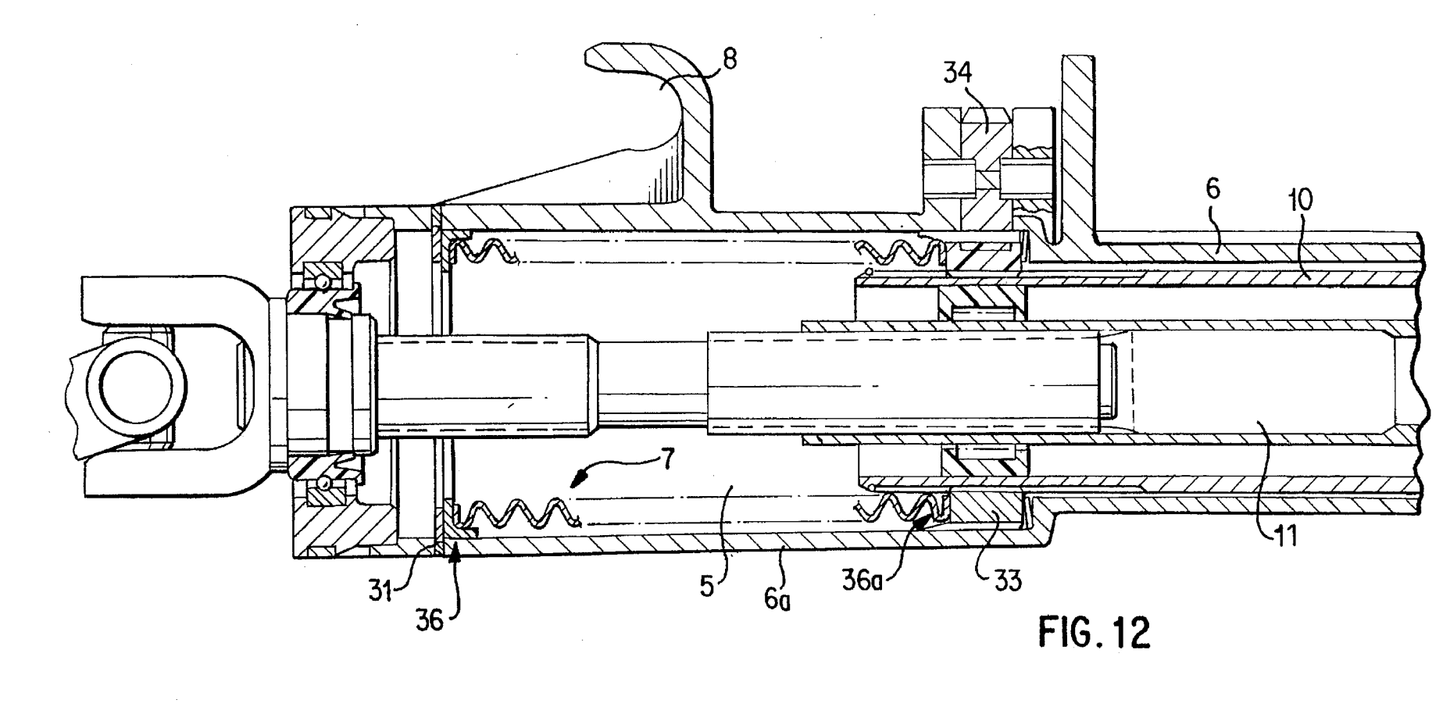
FIG. 12 is a sectional view of an adjusting device in the receiving space of a jacket tube, which adjusting device consists of a spindle nut on the pinion, constructed according to another preferred embodiment of the invention.
Figure 13:
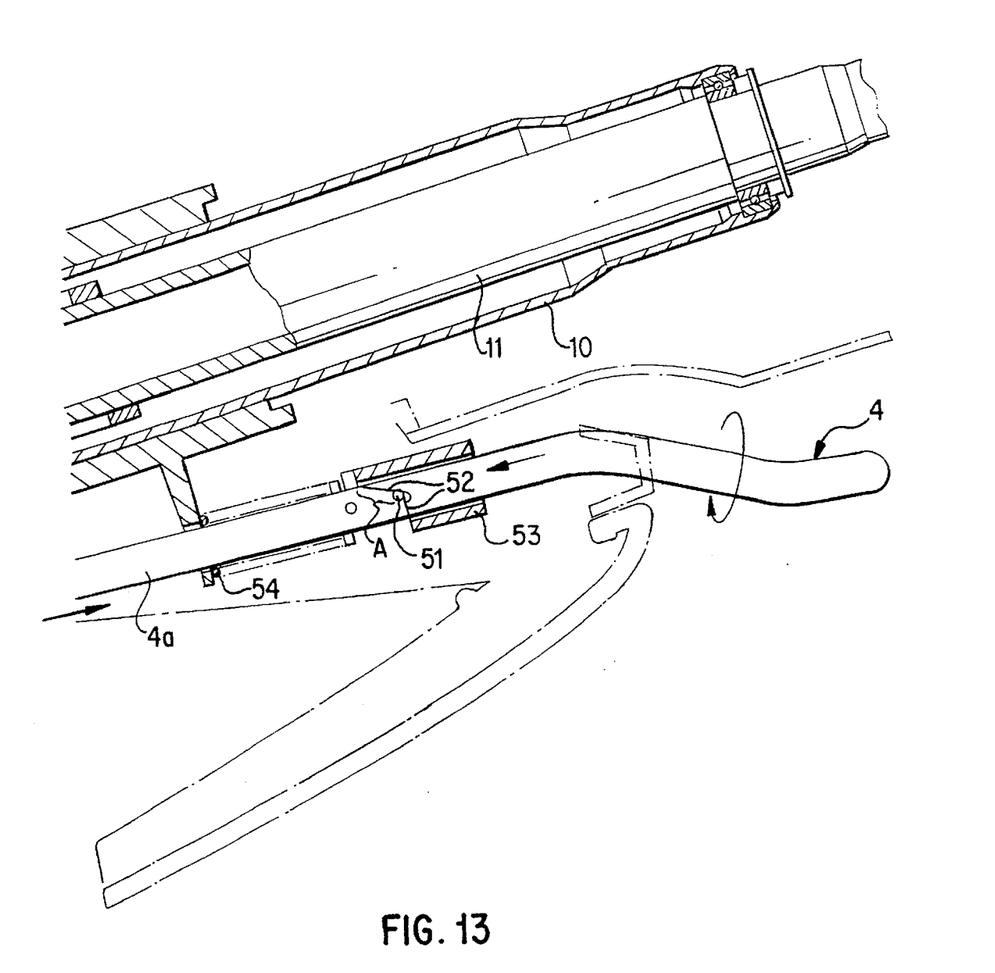
FIG. 13 is a lateral view of the adjusting rod showing a handle with forced guidance, constructed according to a preferred embodiment of the present invention.

The receiving space 5 of the jacket tube section 6a which receives the adjusting device S is dimensioned in such a manner that also an adjusting device can be received which consists of a spindle nut 33 with a pinion 34 (FIG. 12). The pinion 34 is adjusted either manually or by way of a motor. The spindle nut 33 is in an operating connection with the protective steering tube 10 by way of a thread. The deformation element 7 is supported on the spindle nut 33 by means of an end 36a. The end 36 of the deformation element which faces away is held, for example, on a bearing ring 30 (FIG. 3) or a snap ring 31 FIG. 12). A corrugated tube or a reverse tube may be used as a deformation element 7.

Figure 14:
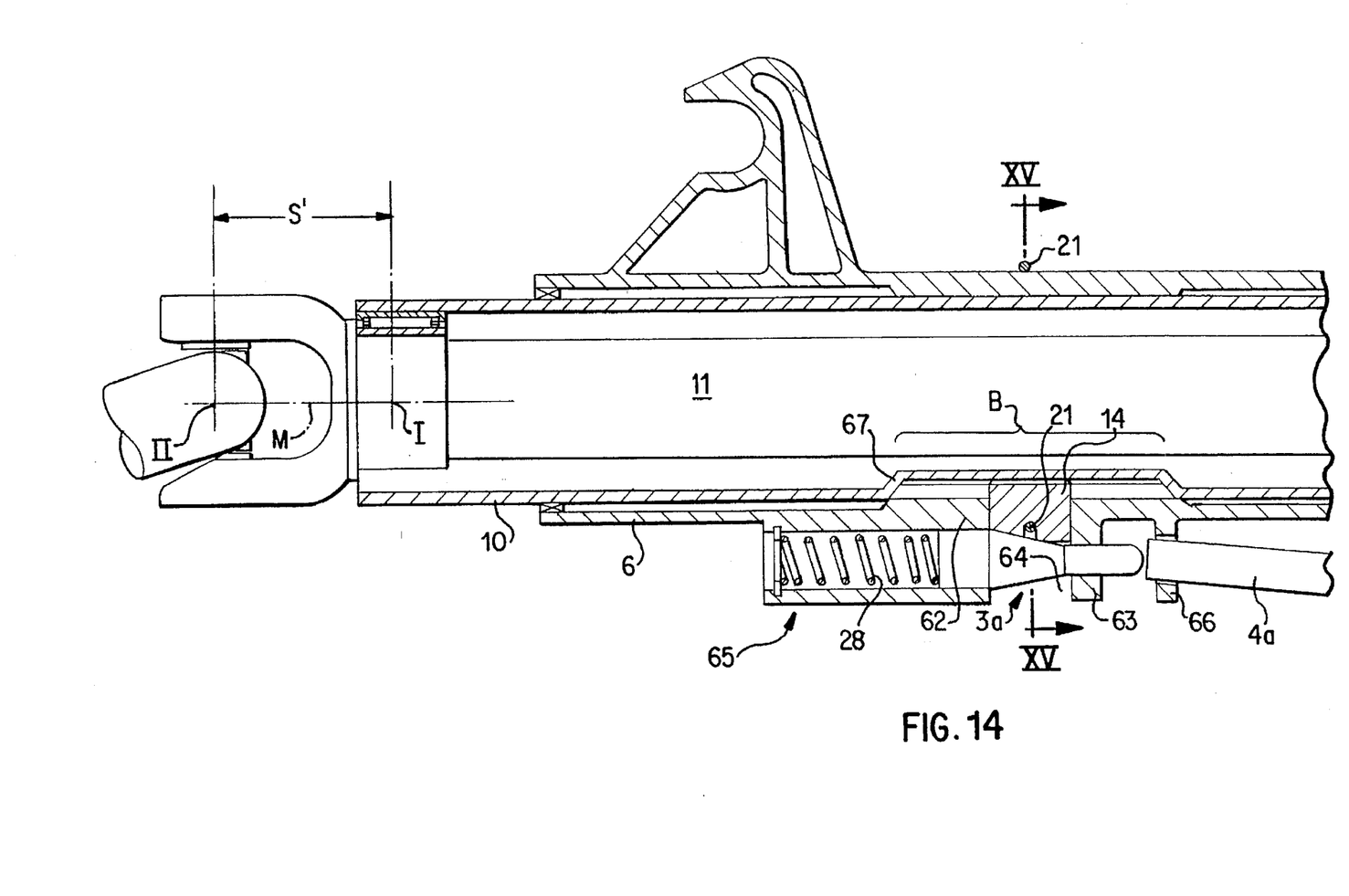
FIG. 14 is a sectional view of another construction of a steering column with an adjusting device in the jacket tube.
Figure 15:
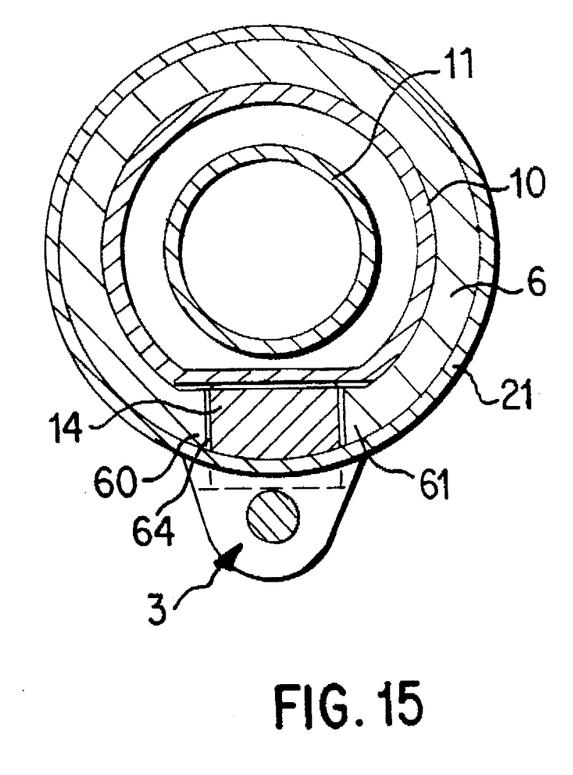
FIG. 15 is a sectional view taken along Line XV—XV of FIG. 14.

According to another embodiment of the device according to FIG. 14 and 15, the adjusting device is arranged in the outer jacket tube 6. This jacket tube 6 has a recess 64 in which the pressure segment 14 is held in a radially displaceable manner between projecting walls 60 to 63.

The pressure segment 14 engages with the toothing 20 of the protective steering tube 10 which is arranged in an indented area B of the tube 10. At this same time, this indentation 67 bounds the adjusting path S of the steering spindle.

FIG. 14 illustrates this axial position S', in which case the center position is defined as M, and the maximally moved-out position is illustrated at II and the moved-in position is illustrated as I. In the illustrated position according to FIG. 14, the pressure segment 14 is in the center position M.

The adjusting device 3D is disposed in an axially displaceable manner in the walls 62 and 63 which extend in an opposite fashion and transversely to the jacket tube 6. The wall 62 is adjoined by a cylindrical receiving device 65 for the spring element 28, which engages with the adjusting device 3D. By means of its end 67, the adjusting rod 4a is disposed in a bent-away web 66.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering assembly for motor vehicles comprising:

a steering spindle, a protective tube surrounding said spindle, a jacket tube surrounding the protective tube, said jacket tube being fixed in position when in an in use position in a vehicle, a rotatable spindle nut threadably connected with a threaded portion of the protective tube so as to axially adjustably move the protective tube and spindle in response to rotation of the spindle nut, a motor drivingly connected to the spindle nut, and a tubular energy absorbing deformation element interposed between the spindle nut and an end of the jacket tube.

2. A steering assembly according to claim 1, wherein said spindle nut is disposed inside the jacket tube.

3. A steering assembly according to claim 1, wherein said jacket tube includes an upper portion and a lower portion, said lower portion defining a larger cross sectional inner space than said upper portion, and wherein said spindle nut is disposed inside the lower portion of the jacket tube.

4. A steering assembly according to claim 3, wherein said tubular energy absorbing deformation element is disposed in the lower portion of the jacket tube below the spindle nut.

5. A steering assembly according to claim 4, wherein an upper axial end of the energy absorbing deformation element abuttingly engages a bottom side of the spindle nut.

6. A steering assembly according to claim 1, wherein a pinion driven by said motor drivingly engages with the spindle nut.

7. A steering assembly according to claim 6, wherein said pinion has a rotational axis extending parallel to a rotational axis of the spindle nut.

8. A steering assembly according to claim 7, wherein said spindle nut is disposed inside the jacket tube.

9. A steering assembly according to claim 7, wherein said jacket tube includes an upper portion and a lower portion, said lower portion defining a larger cross sectional inner space than said upper portion, and wherein said spindle nut is disposed inside the lower portion of the jacket tube.

10. A steering assembly according to claim 9, wherein said tubular energy absorbing deformation element is disposed in the lower portion of the jacket tube below the spindle nut.

11. A steering assembly according to claim 10, wherein an upper axial end of the energy absorbing deformation element abuttingly engages a bottom side of the spindle nut.

* * * * *